United States Patent [19]
Osborne

[11] Patent Number: 6,032,179
[45] Date of Patent: *Feb. 29, 2000

[54] COMPUTER SYSTEM WITH A NETWORK INTERFACE WHICH MULTIPLEXES A SET OF REGISTERS AMONG SEVERAL TRANSMIT AND RECEIVE QUEUES

[75] Inventor: Randy B. Osborne, Newton, Mass.

[73] Assignee: Mitsubishi Electric Information Technology Center America, Inc. (ITA), Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,611

[22] Filed: Aug. 14, 1996

[51] Int. Cl.$^7$ ...................................................... G06F 13/00
[52] U.S. Cl. ........................ 709/213; 709/212; 709/234; 709/245; 709/250
[58] Field of Search ............. 395/200.3, 200.42–200.43, 395/200.46, 200.55–200.64, 200.8, 821, 825–826, 872, 876, 736, 682, 200; 340/825; 709/212–214, 223, 233–234, 243–245, 230–252

[56] References Cited

U.S. PATENT DOCUMENTS

| | | | |
|---|---|---|---|
| 5,251,302 | 10/1993 | Weigl et al. | 710/263 |
| 5,299,313 | 3/1994 | Petersen et al. | 709/234 |
| 5,535,336 | 7/1996 | Smith et al. | 704/225 |
| 5,572,675 | 11/1996 | Bergler | 709/250 |
| 5,664,116 | 9/1997 | Gaytan et al. | 709/234 |
| 5,682,553 | 10/1997 | Osborne | 709/234 |
| 5,742,765 | 4/1998 | Wong et al. | 709/230 |
| 5,751,951 | 5/1998 | Osborne et al. | 709/250 |
| 5,790,804 | 8/1998 | Osborne | 709/245 |

*Primary Examiner*—Zarni Maung
*Assistant Examiner*—Bharat Barot
*Attorney, Agent, or Firm*—Dirk Brinkman

[57] ABSTRACT

A network interface is used to connect a host computer to a network to allow application programs running on the host computer to access the network. Each application program has a set of queues for handling transmit and receive requests. A network interface having direct application access channels has a set of physical registers for storing a set of pointers to one or more of these queues. The set of registers is multiplexed among several ring queues to provide virtual direct application access channels. Such multiplexing is performed by storing the pointers for each queue in memory, e.g., a local memory of the network interface or memory of the host computer. When a transmit or receive request for a given application is processed by the network interface, the network interface determines which set of pointers to use for a queue for the application and loads the correct set of pointers for the queue from the memory and into the set of registers.

8 Claims, 7 Drawing Sheets

COMPUTER SYSTEM WITH A NETWORK INTERFACE WHICH MULTIPLEXES A SET OF REGISTERS AMONG SEVERAL TRANSMIT AND RECEIVE QUEUES

FIELD OF THE INVENTION

The present invention is related to network interfaces for connecting a computer to a network. The present invention is particularly useful in network interfaces providing direct protected access between applications on the computer and the network.

BACKGROUND OF THE INVENTION

Conventional network interfaces for connecting a digital computer to a network generally use one or more queues for controlling transmission and reception of messages to and from the network. There are generally four types of ring queues which are used. A transmit request queue (Txin) has entries which describe buffers of data to transmit. A transmit complete queue (TXdone) has entries which describe buffers which have been transmitted. A free buffer queue (RXin) has entries which describe available buffers in which received data may be deposited. A receive queue (RXdone) has entries which describe buffers filled with received data. There is typically one set of ring queues per network interface connected to the computer.

In a conventional system, to ensure that access between applications on a computer and the network is properly protected, the operating system controls access to these ring queues. For example, an application makes an operating system call to load a transmit request into the transmit request queue. Similarly, an application makes an operating system call to obtain a received buffer. While operating system involvement in handling of the ring queues is a simple solution with general application, it reduces performance because of the overhead involved in invoking operating system activity.

This operating system involvement and resulting overhead can be reduced by using a network interface which allows direct, protected access to applications. Such a network interface has one or more direct application access (DAA) channels for processing transmit and receive requests. Such a network interface is described in "Experiences with a High Speed Network Adapter: A Software Perspective" by P. Druschel, et al. in *SIGCOMM '94*. A network interface having similar functionality is described in U.S. patent application Ser. No. 08/549,940 filed on Oct. 30, 1995 by Randy B. Osborne et al., entitled NETWORK INTERFACE and assigned to the assignee of this application now U.S. Pat. No. 5,751,951.

A direct application access (DAA) channel uses a translation table to map virtual addresses used by an application to physical addresses which are actually used to access memory. The virtual addresses are found in entries in the ring queues to represent locations of, for example, data to be transmitted, buffers describing transmitted data, free buffers and buffers containing received data. Each DAA channel has at least one fill set of ring queues associated with it. One or more applications are associated with each DAA channel. In an asynchronous transfer mode network, each application may have one or more virtual circuits associated with it.

The transmit side of a DAA channel ensures that messages can be sent into the network only for the virtual circuits assigned to that DAA channel. The receive side of a DAA channel ensures that messages from the network can only be sent to applications associated with the DAA channel on which the messages are received. The network interface maintains pointers to the ring queues for each DAA channel in ring queue registers. To perform to virtual to physical address translation, each DAA channel has a separate two-way associative, variable-sized address translation table implemented using a local memory in the network interface and managed by the operating system.

An important issue is the scalability of the DAA channels to support multiple applications. The benefit of direct application access, namely bypassing the operating system, results from mapping the ring queues directly into application address space. In the prior art the number of DAA channels directly supported by hardware is limited, which in turn limits the number of applications which can simultaneously exploit the direct network access for low latency and high bandwidth. There are ways to improve scalability of the prior art, but they are limited.

To provide low latency access for receiving messages, multiple applications can map the same receive queue into their respective address spaces. One or more pages containing the receive queue can be limited to read-only access so that applications can only read and not modify the queue contents. Any pointers which are read can be interpreted only with the aid of proper address translation, so there is no protection problem with one application reading entries destined for another application. The problem with this scheme is that each application has to poll the receive queue and skip over entries belonging to other applications. The performance impact arising from this polling limits the scalability of this solution. A better solution is to allow an unbounded number of receive queues.

Scalability can also be provided by using multiple sources of free buffers. The prior art limits the source of free buffers to one or two ring queues, in essence two global pools of buffers. In some cases it is convenient to allow more choice in the buffer characteristics, such as size or location, than simply choosing from a global pool. For example, if two virtual circuits are used, one virtual circuit may use credit-based traffic management and another virtual channel simultaneously may use rate-based traffic management. Another way to obtain more flexibility is by using a list of buffers per virtual circuit. A linked list scheme for supporting such a list is described in U.S. patent application Ser. No. 08/422,344, filed Apr. 14, 1995 by Randy B. Osborne, entitled NETWORK INTERFACE HAVING PER-CHANNEL INTERNAL AND EXTERNAL FREE BUFFER LISTS WITH SELF-CLEANING MECHANISMS and assigned to the assignee of this application now U.S. Pat. No. 5,682,553. There are several problems with this scheme, including the difficulty in adding to the linked lists and the lack of an intermediate between global queues and private per virtual circuit queues. For example, linked lists cannot be shared between several virtual circuits. A better solution is to have any number of free buffer queues and to allow the virtual circuits to decide which queue should be used for selecting buffers.

In these systems, to provide the benefits of direct application access to the network, each application has its own DAA channel with its own set of ring queues. Such a design requires duplication of hardware for each application using a DAA channel. Therefore, these systems do not scale well, i.e., these systems do not support efficiently many applications with direct, protected access to the network.

SUMMARY OF THE INVENTION

To improve the scalability of a network interface supporting DAA channels, a number of ring queues can be supported by multiplexing ring queue registers among multiple ring queues. Ring queue pointers and all other state information for a ring queue is kept in memory, e.g., host memory or a local memory of the network interface, and loaded into the ring queue registers on demand, similar to virtual paging. Accordingly, the ring queues can be considered as virtual ring queues, resulting in virtual DAA channels.

Accordingly, one aspect of the present invention is a computer system for providing direct access between application, and a network interface in order to allow application programs running on the host computer to access the network. Each application program has a set of queues for handling transmit and receive requests. The network interface has direct application access channels defined by a set of physical registers for storing a set of pointers to a ring queue. Virtual direct application access channels are provided by storing the set of pointers for each ring queue in memory, e.g. in local memory of the network interface. When a transmit or receive request for a given application is processed by the network interface, the network interface determines which set of pointers to use for a queue for the application and loads the set of pointers for the queue from the memory into the registers.

BRIEF DESCRIPTION OF THE DRAWINGS

These and other features of the Subject Invention will be better understood in connection with the Detailed Description taken in conjunction with the Drawing of which.

DETAILED DESCRIPTION

Figure 1:
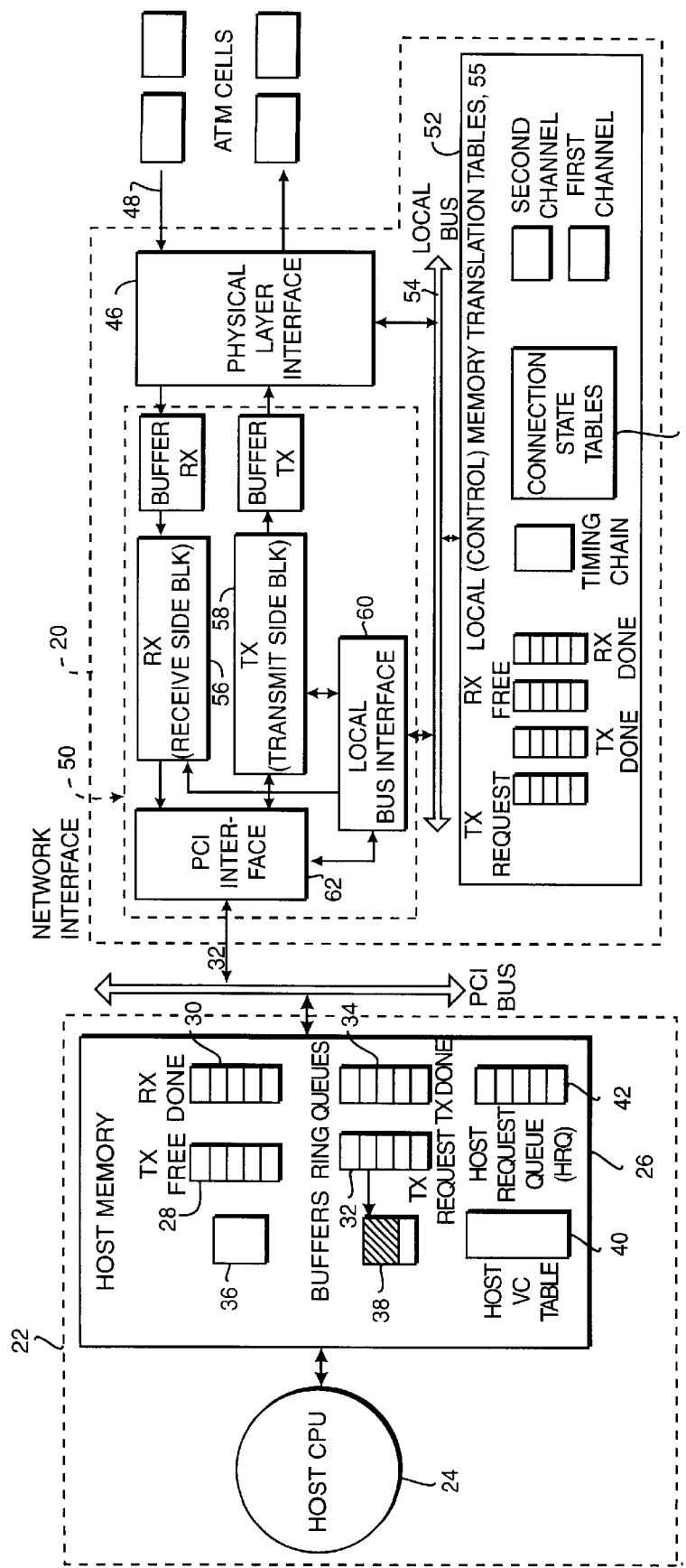
FIG. 1 is a block diagram of a direct application access (DAA) channel architecture.

Referring now to FIG. 1, a network interface 20 is connected to a host computer system 22 including a host processor 24 and host memory 26. The host memory includes ring queues 28, 30, 32 and 34 for handling transmit and receive requests. An entry in queues 28 and 32 points to buffers 36 and 38 respectively. Host memory also includes a host virtual circuit (VC) table 40 for storing state information about VC's and a host request queue (HRQ) 42 for handling interrupt and fault notifications. The network interface is connected to the host memory via an I/O bus 44 such as a peripheral component interconnect (PCI) bus.

The network interface includes a physical layer 46 which connects to a network 48 to send and receive information. For example, where the network is an asynchronous transfer mode (ATM) network, ATM cells are sent and received over the network 48 through the physical layer 46. A controller chip 50 receives and sends messages to and from the physical layer 46. Both controller and physical layer 46 are connected to a local memory 52 via a local bus 54. Receive side processing is performed within the controller chip by a receive side block. 56. Transmit side processing is performed by a transmit side block 58. The receive side block and transmit side block communicate with the local memory via a local bus interface 60, for example, to access connection table 53 and translation tables 55. The receive side block and transmit side block communicate with the host computer over the I/O bus 44 via an interface 62.

Figure 2:
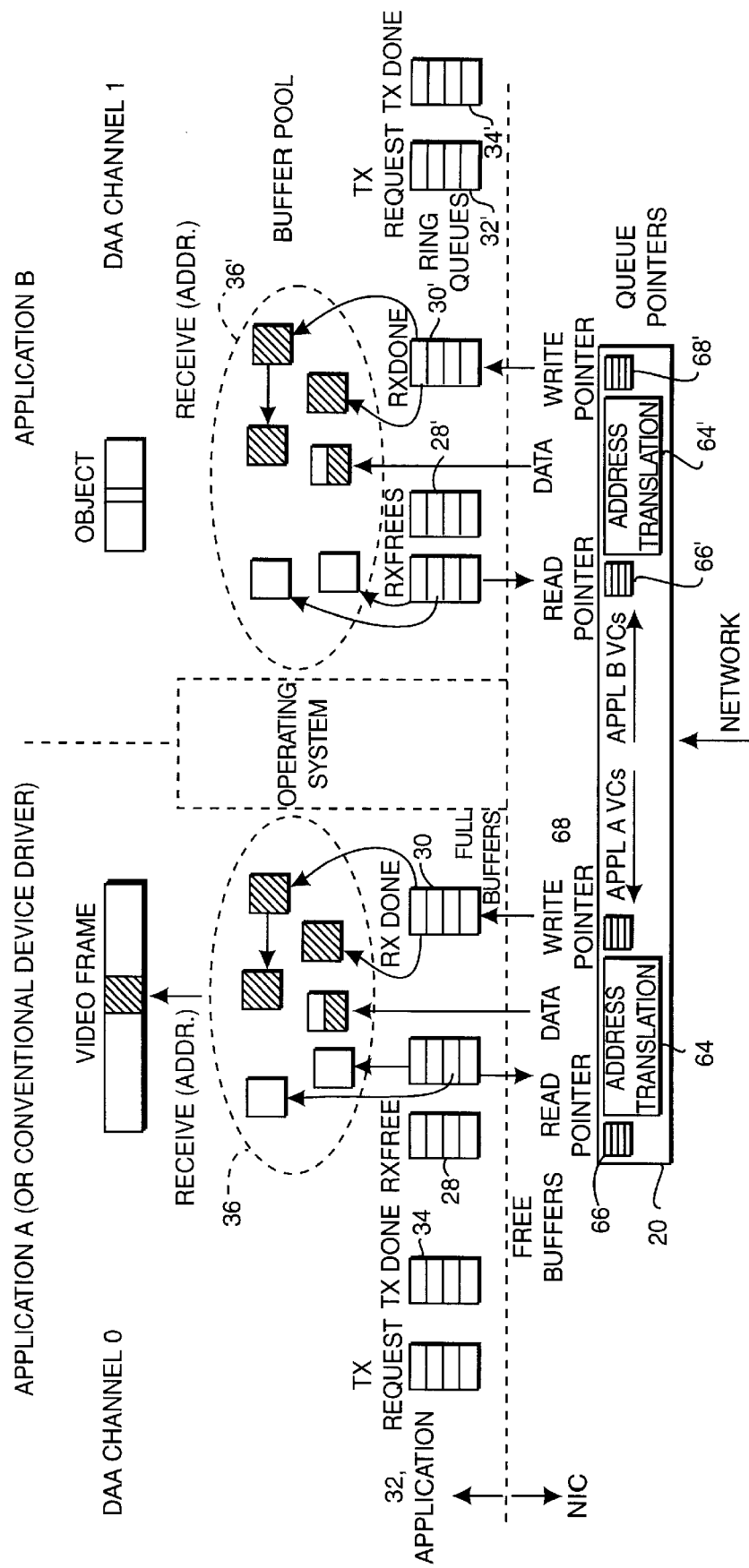
FIG. 2 is a more detailed block diagram of FIG. 1, illustrating duplicate, physical DAA channels.

FIG. 2 shows one embodiment of the system shown in FIG. 1. In this embodiment, the network interface supports two DAA channels using duplicate hardware. A first DAA channel supports one application, with a multiplicity of virtual circuits, and having a transmit request queue 32, transmit complete queue 34, free buffer queue 28 and receive queue 30. Entries in the free buffer queue 28 point to free buffers from buffer pool 36. Entries in receive queue 30 describe buffers filled with received data. For the first DAA channel, the controller chip 50 in the network interface 20 performs address translation as indicated at 64 and holds pointers to the transmit queue 32 and 34 in queue registers as indicated at 66 and pointers to receive queues 28 and 30 in queue registers 68. To support a second DAA channel, duplicate hardware is provided as shown in FIG. 2. Accordingly, the elements of the second DAA channel are labeled with identical numbers followed by an apostrophe (e.g., 36').

Clearly, a design requiring such duplication of hardware for each (as shown in FIG. 2) is not scalable. Some scalability may be provided by using a linked list of free buffer pointers for each virtual circuit in local memory 52 of the network interface, as described in U.S. patent application Ser. No. 08/422,344, filed Apr. 14, 1995 by Randy B. Osborne, entitled NETWORK INTERFACE HAVING PER-CHANNEL INTERNAL AND EXTERNAL FREE BUFFER LISTS WITH SELF-CLEANING MECHANISMS and assigned to the assignee of this application now U.S. Pat. No. 5,682,553. However, it is difficult to add free buffers to the linked list and there is no way for different virtual circuits to share buffers other than through a free buffer ring queue. Additionally, such a system requires a shared receive queue 30. This solution works well only for a small numbers of applications and does not scale well.

To overcome these limitations on scalability of the prior DAA systems, the present invention provides a system with virtual DAA channels. In other words, address translation tables and pointers to transmit and receive queues are loaded into queue pointer registers upon demand.

Figure 3:
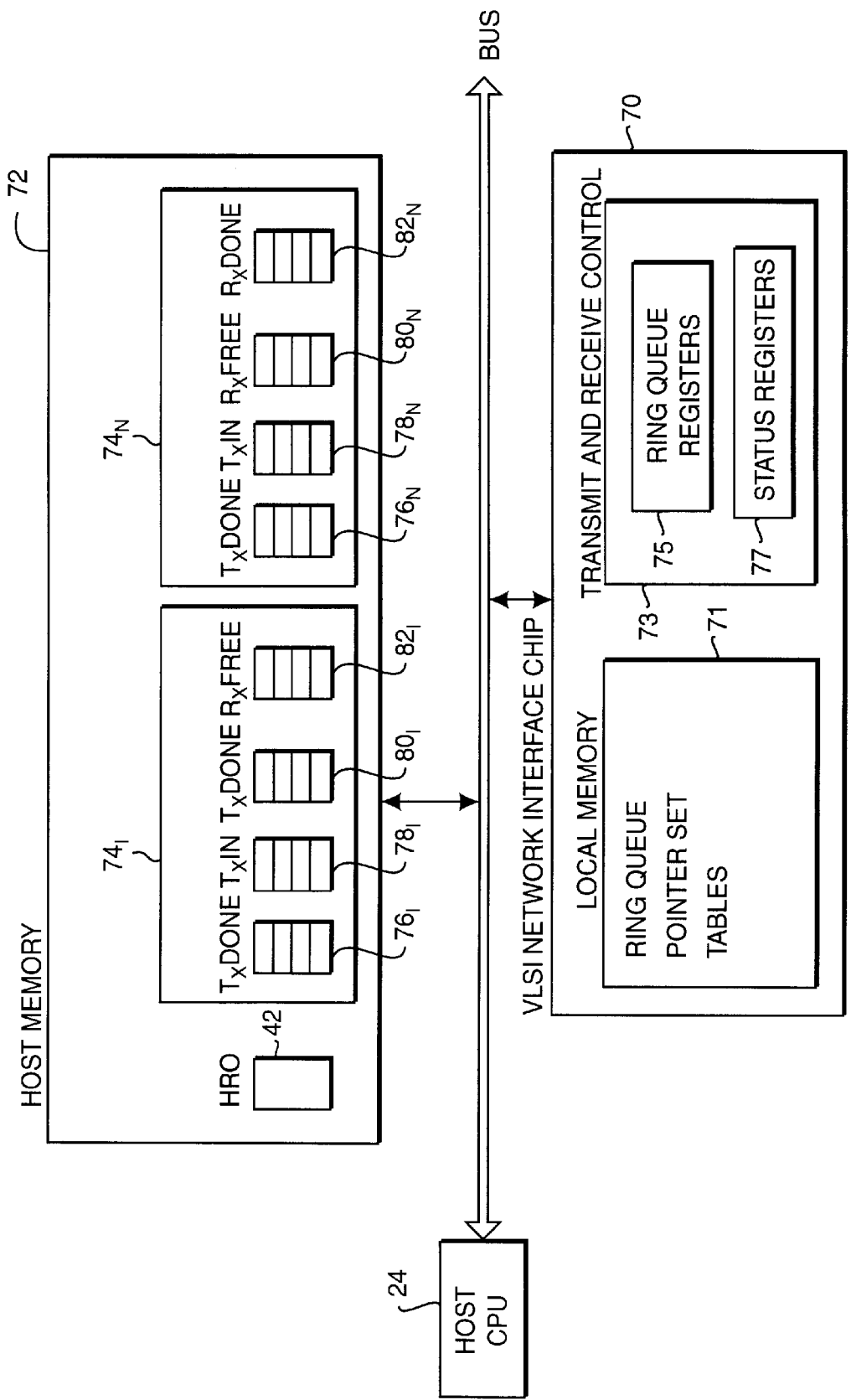
FIG. 3 is a block diagram of a host computer and a network interface supporting multiple virtual DAA channels, in one embodiment of the present invention.

One embodiment of the present invention will now be described in more detail in connection with FIGS. 3–7. In FIG. 3, the host processor (CPU) 24 is connected by a bus 44 to host memory 72, used by several applications 74. Each application has its own transmit queues 76 and 78 and receive queues 80 and 82. These queues are ring queues defined by a set of values, including a base address, a limit address and a pointer to access the queue. A ring queue may also be defined by an enable bit, watermarks for generating interrupts, and other state information. A set of these values for a queue is stored in a set of registers in the network interface and is used to access the queue. A host request queue (HRQ) 42 is used for receiving interrupts and fault notifications form the network interface 70. The network interface 70 has queue pointer registers 75, status registers 77 and associated logic 73 for storing pointers to and parameters of the transmit and receive queues. A local memory includes ring queue pointer set tables 71, which store the pointers of several ring queues which are loaded on demand into ring queue registers 75.

Figure 4A:
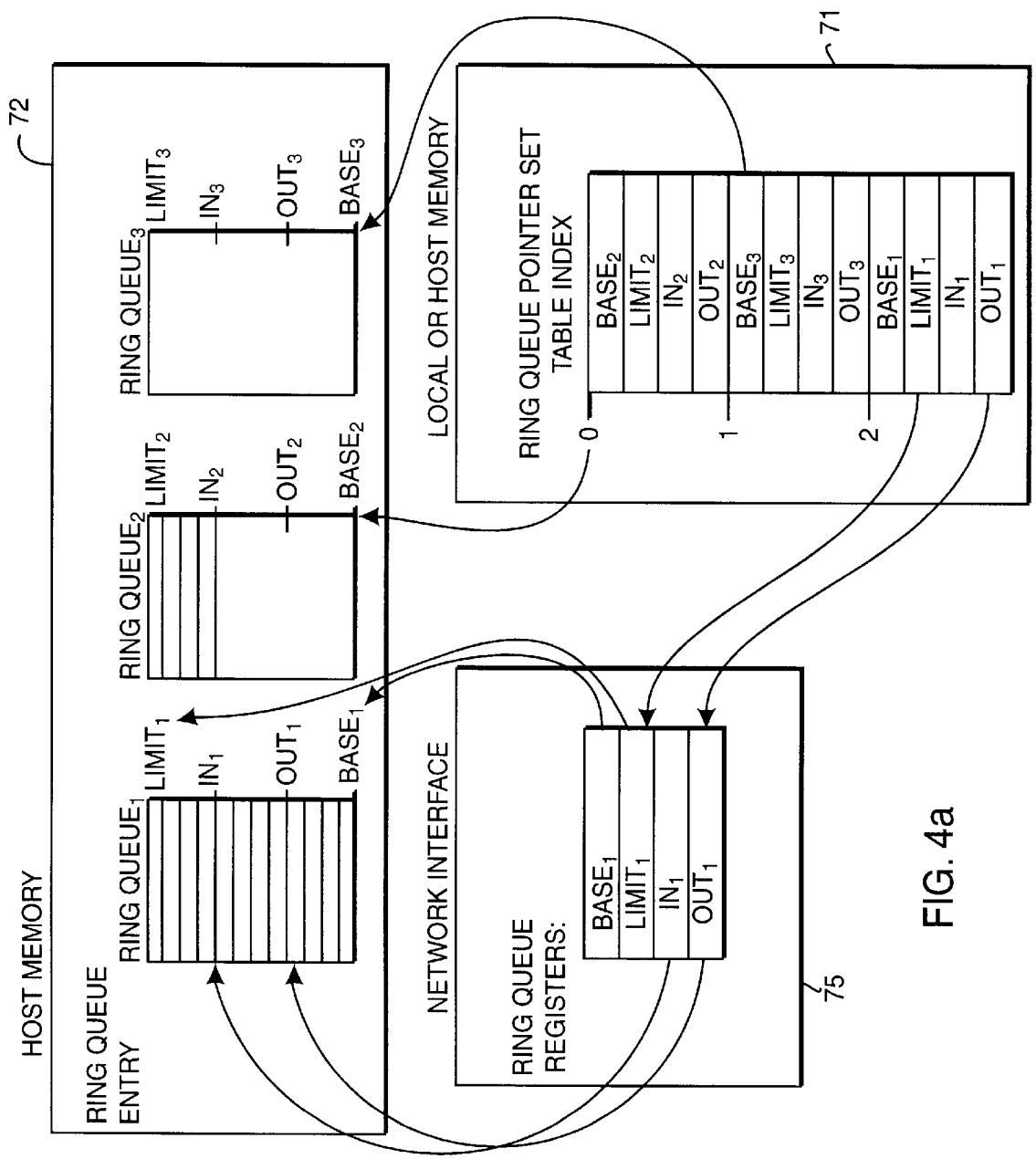
FIG. 4A is a diagram illustrating the relationship between ring queues, ring queue pointer set tables and ring queue registers.
Figure 4B:
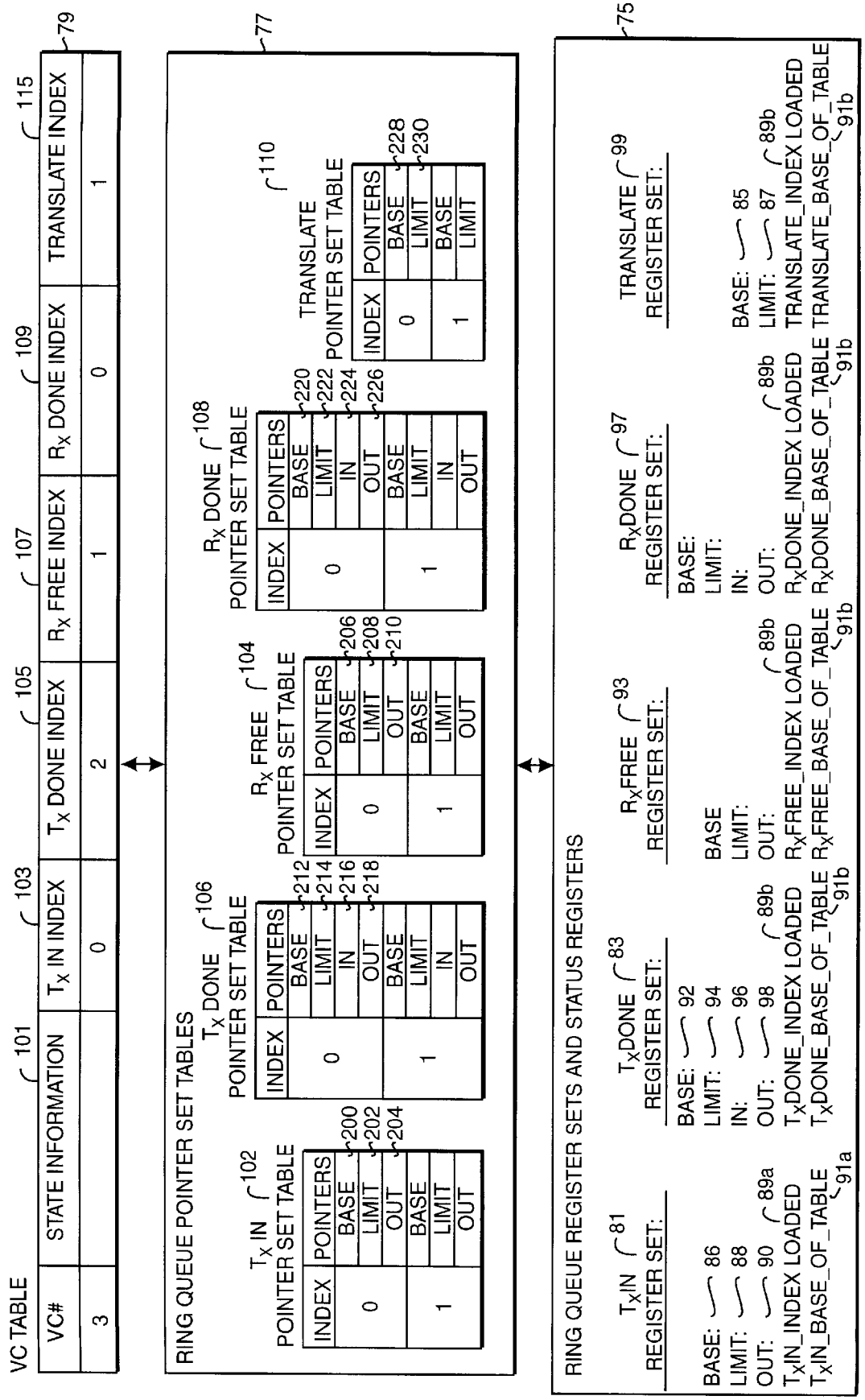
FIG. 4B is a diagram illustrating details of a VC table, ring queue pointer set tables and ring queue register set.

FIG. 4A illustrates an example of output ring queues in host memory 72 for which the network interface produces the entries. An output queue has a base address (e.g., $base_1$), a limit address (e.g., $limit_1$), and IN and OUT pointers indicating the location into which data is written by the network interface, and the location from which data is read by an application (e.g., $IN_1$ and $OUT_1$). For input queues, from which the network interface reads information, an IN pointer is not stored by the network interface. The ring queue registers 75 store the base address, limit address, IN pointer and OUT pointer for a given output queue. In the example shown in FIG. 4A, ring queue registers currently hold pointers for ring queue 1. A ring queue pointer set table 71, which may be in local memory of the network interface or host memory, contains the pointers to all of the ring queues in the host memory 72. The ring queue pointer set table 71 includes the addresses for ring queues 1, 2 and 3. In the state of the network interface as shown in the example of FIG. 4A, only ring queue 1 can be accessed. If ring queue 2 is to be accessed, for example, for the network interface to write an entry, the IN queue pointers for ring queue 2 must be copied from the ring queue pointer set table 71 into the ring queue register 75. This example assumes that a ring queue 1 and ring queue 2 are both the same kind of ring queue (e.g., they are both a transmit complete queue).

There is a pointer set table and register set for each kind of ring queue for an application. The structure of the pointer set tables and the registers sets, and how they are accessed using a virtual circuit table, will now be described in connection with FIG. 4B. Ring queue register sets 75 include the transmit request queue register set 81, the transmit complete register set 83, the free buffer queue register set 93, and the receive queue register set 97. A translation table register set 99 is also provided. The transmit request queue register set includes registers for storing the base address 86, limit 88 and OUT pointer 90 of a transmit request queue 76. In the free buffer queue register set 93, similar registers are used to store base, limit and OUT pointers for the free buffer queue 80. The transmit complete queue register set includes registers for storing, a base 92, limit 94, and input and output pointers 96 and 98 of a transmit complete queue 78. In the receive queue register set 97, similar registers are used to store the base address, limit and IN and OUT pointers of a receive queue 82. The translation table register set 99 includes base and limit registers 85 and 87, respectively, for storing an address set performing virtual address to physical address mapping, and virtual address validation.

The values in the registers sets 81, 83, 93, 97 and 99 are loaded either from host memory or from the local memory 100 of the network interface upon demand. Each of the possible sets of values for these register sets is stored in a set of pointer set tables 102, 104, 106 and 108 and address set table 110. The base address of each table is stored by the network interface in a set of registers 91a–91e. The index of the currently loaded register set for each ring queue is also stored by the network interface in registers 89a–89e. The registers 89a–89e and 91a–91e constitute the status registers 77.

Table 102 is the transmit request queue pointer set table. For a given transmit request queue, the transmit request queue pointer set table includes the set of pointers defining the queue. Each pointer set includes base address 200 of the queue, the limit 202 of the queue, as indicated by a limit address, size or mask, and the OUT pointer 204 used by the network interface to read from the queue. The OUT pointer 210 may be stored as a virtual address, physical address or both, using additional entries in the pointer set table.

Table 104 is the free buffer queue pointer set table. For a given free buffer queue, the free buffer queue pointer set table includes the set of pointers defining the queue. Each pointer set includes a base address 206 of the queue, the limit 208 of the queue, as indicated by a limit address, size or mask, and the OUT pointer 210 used by the network interface to read an indication of a free buffer from the queue. The OUT pointer 210 may be stored as a virtual address, physical address or both, using additional entries in the pointer set table.

Table 106 is the transmit complete queue pointer set table. For a given transmit complete queue, the transmit complete pointer set table includes the set of pointers defining the queue. Each pointer set includes a base address 212 of the queue, the limit 214 of the queue, as indicated by a limit address, size or mask, the IN pointer 216 used by the network interface to write into the queue, and the OUT pointer 218 used by the host computer to read from the queue. The IN pointer may be stored as a physical address, virtual address or both, using additional entries in the pointer set table. The OUT pointer is stored as virtual address.

Table 108 is the receive queue pointer set table. For a given receive queue the receive queue pointer set table includes the set of pointers defining the queue. Each pointer set includes a base address 220 of the queue, the limit 222 of the queue, as indicated by a limit address, size or mask, the IN pointer 224 used by the network interface to write into the queue and the OUT pointer 226 used by the host computer to read from the queue. The IN pointer may be stored as a physical address, virtual address or both, using additional entries in the pointer set table. The OUT pointer is stored as virtual address.

These ring queue pointer set tables also may store any state information associated with a ring queue using additional entries. For example, a bit may be used to indicate whether a ring queue is enabled. Additionally, watermark levels may be defined for use in bounds checking, described below.

Table 110 is the translation address set table. For a given ring queue, the translation address set table includes an address set representing the base physical address 228 for translation and the limit 230 for the address space.

The local memory of the network interface also includes a virtual circuit(VC) table 79 which store numerous state values 101 for each virtual circuit. The VC table is augmented in the present invention to include indices 103, 105, 107, 109 and 115 into the ring queue pointer set tables and address set table to access the sets defining ring queues associated with the virtual circuit and the translation table. These indices are used to access corresponding entries in the pointer set tables 102, 104, 106 and 108 and address set table 110 to obtain the pointer set of a ring queue and an address set for translation. While each virtual circuit has an index into the pointer set table for each of its ring queues, different virtual circuits may have the same indices into one or more of the tables 102, 104, 106, 108 and 110. Accordingly, for each message to be processed for a particular virtual circuit, the appropriate pointer and address set for a given ring queue can be retrieved from the tables using the virtual circuit number. The pointer and address sets are placed in the appropriate register set in the network interface.

The process of multiplexing the register sets 81, 83, 93, 97 and 99 among multiple queues will now be described in connection with FIGS. 5–8. Specific conditions invoke this process. For the receive queue, the pointer set is loaded when attempting to write an entry to the queue. For the free buffer queue, the pointer set is loaded when the network interface requests a free buffer. The translation table pointers are loaded when a page boundary is crossed or when a new buffer is obtained. The pointer set of the transmit complete queue are loaded when an entry is added to the queue. Loading of the transmit request queue pointer set is done to read a frame descriptor of a transmit request from the transmit request queue for a given channel. Determining whether a transmit request is available to be read is a more complex issue which is discussed in more detail below.

Figure 5:
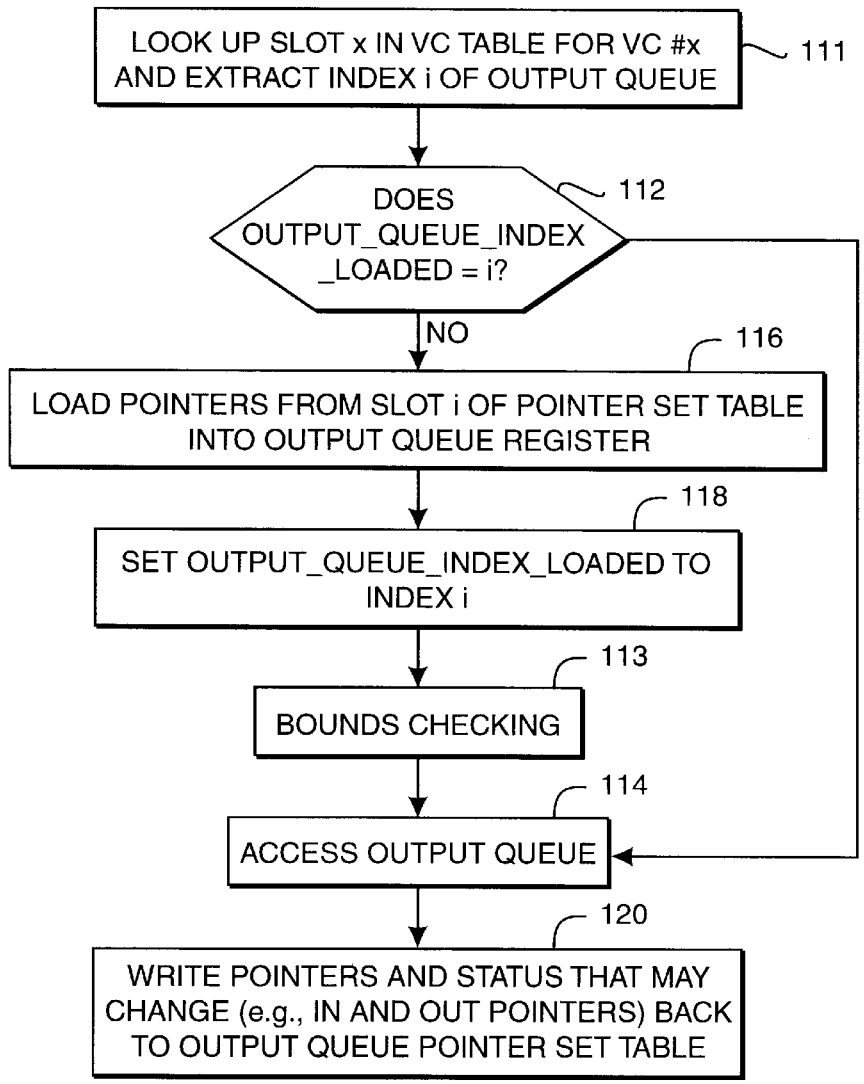
FIG. 5 is a flowchart describing the process of multiplexing the physical DAA channel registers of an output queue among multiple output queues.

Referring now to FIG. 5, handling of output queues (TXdone and RXdone) will now be described. First given a virtual circuit number (VC#) x, slot x in the VC table 79 is accessed to extract the index i into the output queue pointer set table (step 111). If the queue pointer register set (83 or 97) is already loaded with the proper pointer set, as determined by comparing index i to the index-loaded value (89*b* or 89*d*) of the output queue (step 112), the output queue can be accessed using the pointers in the queue pointer register set (step 114) after bounds checking in step 113. The transmit complete queue 78 and receive queue 82 are accessed in step 114 by write operations using the IN pointer, which is then updated.

If the index in register 89*b* or 89*d* of the currently loaded pointer set for the output queue is not the same as the current index i, the pointer set is retrieved from slot i of the pointer set table (106 or 108) for the output queue (step 116). After a new set of pointers is loaded from one of the pointer set table into the register set (83 or 97), the index i is stored in the register 89 in step 118. Processing continues by bounds checking (step 113), accessing the output queue (step 114).

After the output queue is accessed, any pointers and status that may change (e.g., IN and OUT pointers) are stored back into the output queue pointers set table in step 120. Alternatively, these values may written back prior to loading a new pointer set, i.e., prior to step 116.

Figure 6:
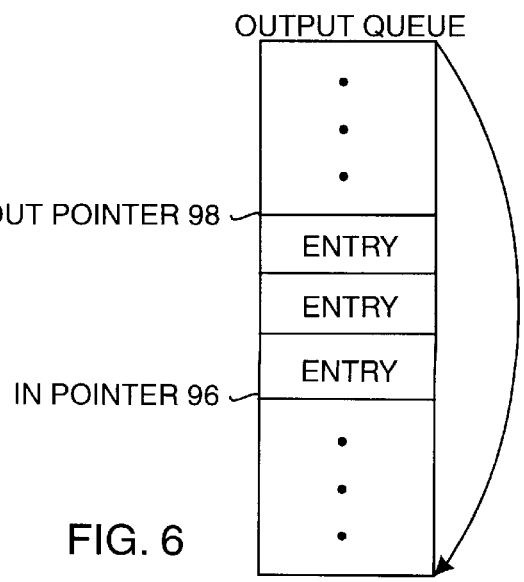
FIG. 6 is a diagram of an output queue, indicating IN and OUT pointers.
Figure 7:
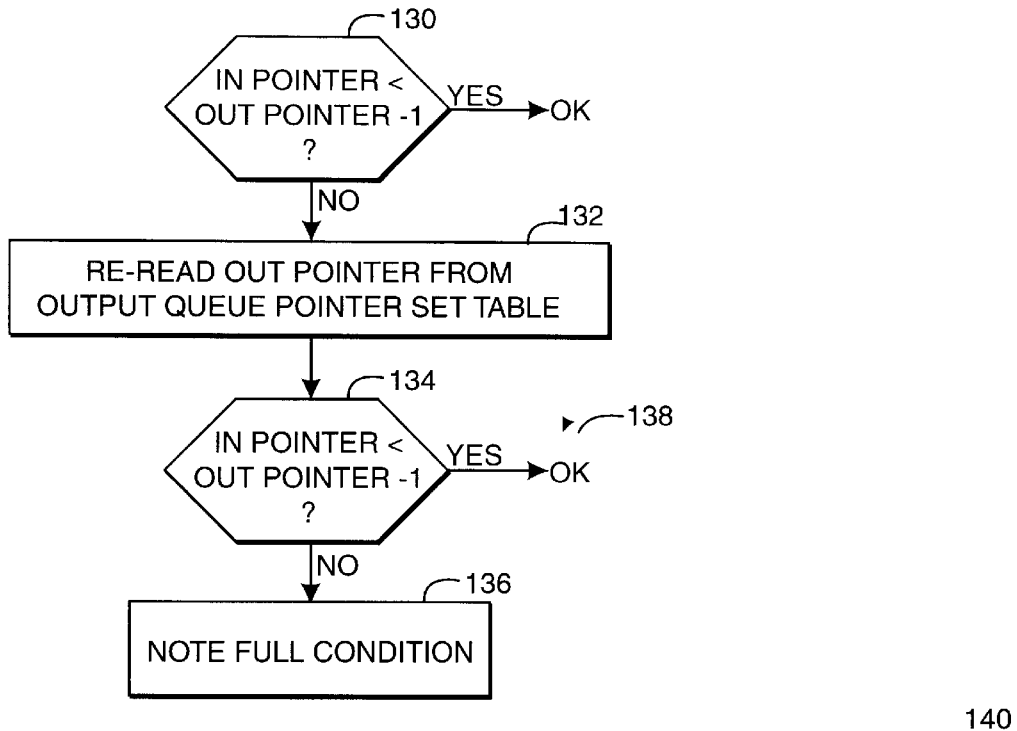
FIG. 7 is a flowchart describing how bounds are checked on the IN and OUT pointers of an output queue.

In the process of FIG. 5, for accesses involving the transmit complete queue 78 or receive queue 82, the IN and OUT pointers are checked to determine whether the queue is full or empty. Other watermark levels may also be checked using state information. For example, the watermark levels also may be stored in the ring queue pointer set table. Such bounds checking is performed in step 113 in FIG. 5. Referring now to FIG. 6, the IN pointer for an output queue is the location where the network interface begins writing to the queue. The host computer starts reading from the output queue using the OUT pointer. However, the host computer still may read from the queue when the current OUT pointer is loaded in register set 83 or 97 of the network interface. While the host computer can update the OUT pointer stored in the pointer set table 106 or 108, it cannot update the values in the pointer register set 83 or 97 in the network interface since the host cannot atomically determine which ring queue is loaded and modify the OUT pointer. Thus, the OUT pointer in the pointer register set 83 or 97 may become invalid, and is therefore treated as a cached value. It is for this reason that the OUT pointer is not stored back into the pointer table in the multiplexing process described above in connection with FIG. 5. Rather than treating an update to the OUT pointer in the pointer set table 106 or 108 as an invalidation of the OUT pointer in the queue pointer registers 84, detection of a full condition relies on the fact that the OUT pointer can only be monotonically increasing. Accordingly, a process for identifying when the transmit complete queue or receive queue is full checks the cached value (in the pointer register set 83 or 97) first. If the cached OUT pointer does not indicate a fill condition, the queue is not full. This process will now be described in more detail in connection with FIG. 7. A similar process may be used to detect various watermark levels.

The full condition of the transmit complete queue or receive queue is checked when data is written to the queue, as indicated in step 113 of FIG. 5. If the OUT pointer minus 1 is greater than the IN pointer, as determined in step 130, the queue is not full, and normal processing continues. If the test of step 130 fails, the OUT pointer is then re-read from the pointer set table 106 or 108 in step 132 and the new OUT pointer minus 1 is compared to the IN pointer in step 134. If this condition fails, a full condition is indicated in step 136. Otherwise, the queue is not full as indicated at step 138, and normal processing may continue. Full, empty or various watermark levels can be detected and interrupts can be generated in this manner.

Handling of interrupts and faults from each ring queue also should be scalable, which precludes the use of dedicated interrupt bits for each DAA channel. In one embodiment, interrupts and fault indicators are delivered to the host computer via entries written to the HRQ 42.

Figure 8:
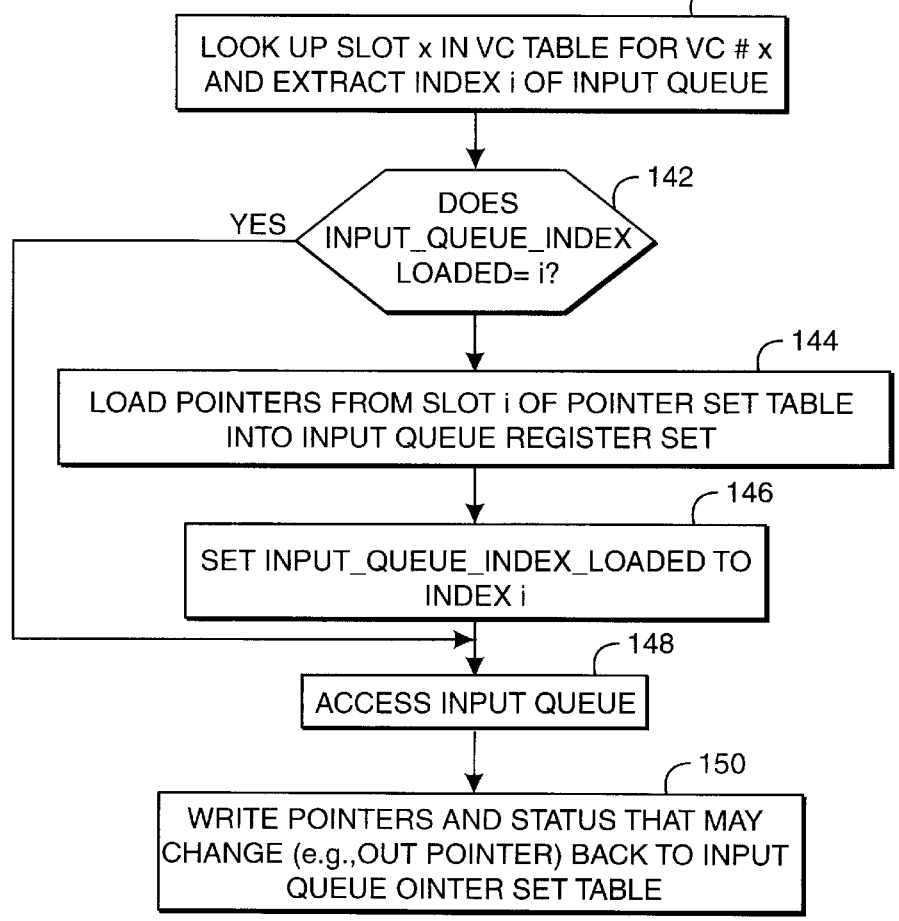
FIG. 8 is a flow chart describing the process of multiplexing the physical DAA channel registers of an input queue among multiple input queues.

The process of multiplexing registers sets for an input queue among multiple input queues will now be described in more detail in connection with FIG. 8. Multiplexing of the translation table registers is performed in a similar manner. In this process, given a virtual channel number (VC#) x, slot x in the VC table 79 is accessed to extract the index i of the input queue 103 or 107 (Step 140). The input queue index loaded value (89*a* or 89*c*) from the status registers 77 is compared to the index i in step 142. If these values are the same, indicating that the desired pointer set is already loaded in the input queue register set (81 or 93), the input queue is accessed in step 148. If the desired pointer set is not loaded in the input queue register set 81 or 93, the pointer set is loaded from slot i of the pointer set table 102 or 104 into the input queue register set in step 144. The input queue index loaded value 89 is then set to the index i. The input queue can then be accessed in step 148.

After the input queue is accessed in step 148, write pointers and status information that may change (e.g., the OUT pointer) is stored back in the input queue pointer set table in step 150.

A special problem exists in the handling of the transmit request queues. In the foregoing description, it is assumed that the network interface has already received notification of a transmit request. A transmit request can be received in several ways.

One way the network interface can receive notification that a transmit request has been queued is for the network interface to poll every transmit request queue. This solution does not scale well, however.

Second, it is possible to use only one or two transmit request queues for almost all of the virtual channels. Such a request queue can be accessed using only one I/O bus access by the network interface, but may incur dynamic chaining, as described in U.S. patent application Ser. No. 08/549,940 filed on Oct. 30, 1995 by Randy B. Osborne et al., entitled NETWORK INTERFACE and assigned to the assignee of this application now U.S. Pat. No. 5,751,951. One drawback of this method is that operating system overhead would be incurred to insert the request into the queue, which would be done by a trap to the kernel. Using a translation map for each virtual circuit, no pointer validation is performed and minimal overhead would be involved.

Third, a notification vector can be used to indicate which of a plurality of virtual circuits have pending transmit requests. This notification vector, for example, may have a bit for each virtual channel it represents. The notification vector can be periodically checked by the network interface to identify a transmit request queue that has an entry to be processed. One problem with this mechanism is that it does not scale well.

A fourth notification method involves using a notify queue. The network interface periodically reads from a single queue, wherein each entry indicates a particular transmit request queue to be accessed. Such a structure scales well, but requires two bus and memory accesses to obtain the entry of the transmit request from the transmit request queue.

There are some complications in the use of direct application access for notification. First, only a limited number of registers can be mapped directly to application spaces. Some serialization is therefore eventually required. Additionally, scheduling complications restrict polling generally to a maximum of two ring queues.

In view of these complications, another way to handle notification is to virtualize which application can have direct access to a notification vector or queue. That is, applications are bound dynamically, rather than statically, to the notification hardware. A low latency mode is defined, which is entered by making a call to the kernel. The kernel call maps the application page to the transmit receive queue and returns the latest IN pointer to the application. While in low latency mode, the application can access the transmit receive queue directly. By combining notification with the data itself, the lowest latency can be achieved. A kernel call is then used to exit the low latency mode, which stores the latest IN pointer in the kernel and unmaps the application page, or removes its write permission, to the transmit receive queue.

In view of some of the complexities in handling transmit requests, it is possible to provide an application with access to a virtual DAA channel only for receive side processing.

In another embodiment, duplicate hardware is provided to support two physical DAA channels. The first DAA channel is used for multiplexing. The second DAA channel is used by a single application and does not support multiplexing. Its operation, use and construction are identical to that of the prior art. Such a second channel can be used to guarantee performance and avoid problems of thrashing that may occur on the first DAA channel due to swapping in and out ring queue pointers.

In another embodiment, there may be multiple physical register sets that all use the same pointer set tables. In this embodiment, however, mechanisms must be added to ensure coherency, i.e., to prevent one register set from using pointer values that have been modified by the other register set.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. An apparatus providing direct access between one or more applications executed on a computer and a network interface which connects the computer to a network, the computer having memory utilized by both the applications and the network interface, the apparatus comprising:

a plurality of registers in the network interface for storing references to locations in the memory of the computer, wherein the locations in the memory of the computer are for storing one or more queues of transmit and receive operations between each of the one or more of the applications and the network;

memory locations containing the references to the locations in the memory of the computer storing the queues of transmit and receive operations for each of the one or more applications;

means, operative in response to a request to process an operation for one of the applications, for selecting from the memory locations references to the locations in the memory of the computer where the queues of transmit and receive operations for the application requesting the operation are stored and for copying the selected references from the memory locations into the plurality of registers; and means for controlling direct access to the network by the application using the references stored in the plurality of registers.

2. The computer system of claim 1, wherein the apparatus includes means for dynamically binding an application to a notification mechanism for messages to be transmitted by the application to the network, and wherein the plurality of registers stores a reference to the notification mechanism.

3. The computer system of claim 1, wherein the apparatus includes a notification mechanism for each application, and wherein the means for controlling direct access includes means for polling the notification mechanism of each application.

4. The computer system of claim 3, wherein the notification mechanism is a notification vector including a bit for indicating availability of a transmit request for each application.

5. The computer system of claim 1, wherein the apparatus includes a single notification mechanism for a plurality of applications, and wherein the means for controlling include means for selecting an operation to be performed by accessing the notification mechanism.

6. The computer system of claim 1, wherein the means for controlling direct access to an application includes means for checking bounds of the references in the plurality of registers by first comparing a reference in the register to a bounding value and, if a bounds check fails, by comparing a reference stored in the memory locations for the application to the bounding value.

7. The computer system of claim 1, wherein the plurality of registers define a ring queue.

8. The computer system of claim 7, further comprising:

a table containing state information of each virtual circuit and for storing an index into the memory locations to retrieve references defining the ring queues of the virtual circuit.

* * * * *